G. H. WOOTEN.
BRAKE APPLYING MECHANISM.
APPLICATION FILED JAN. 23, 1914.
1,121,317.
Patented Dec. 15, 1914.
2 SHEETS—SHEET 1.
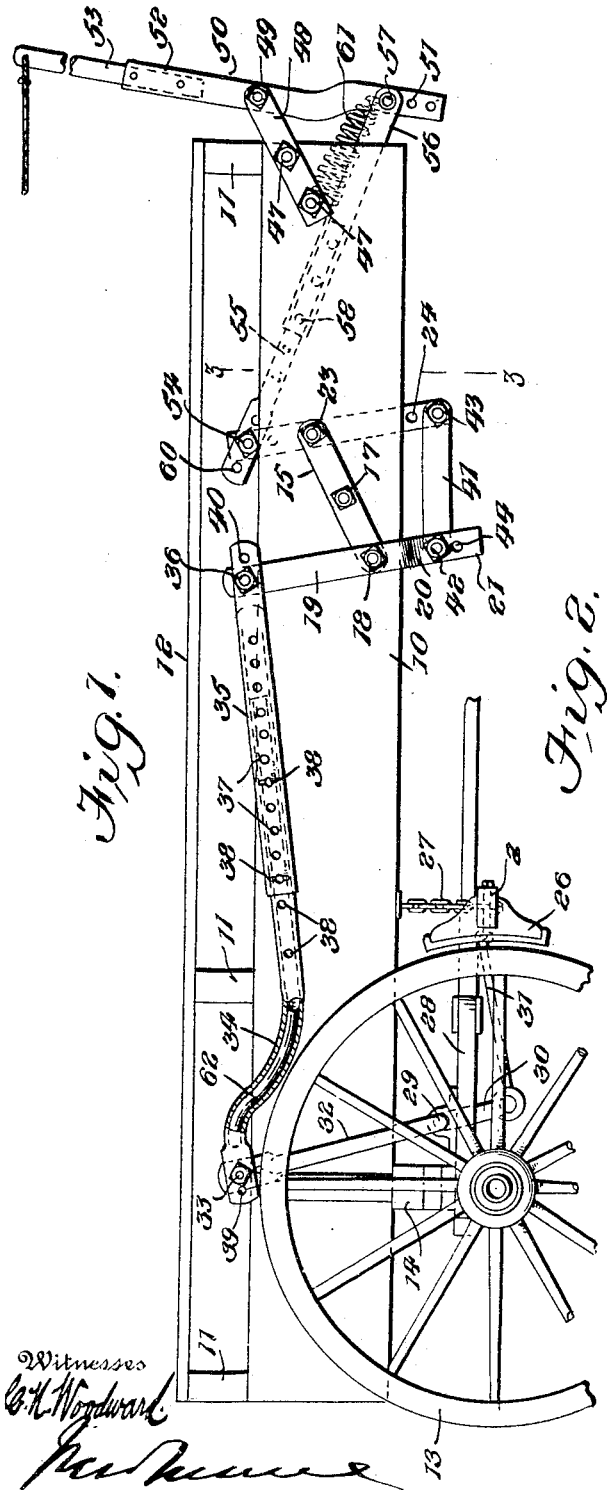
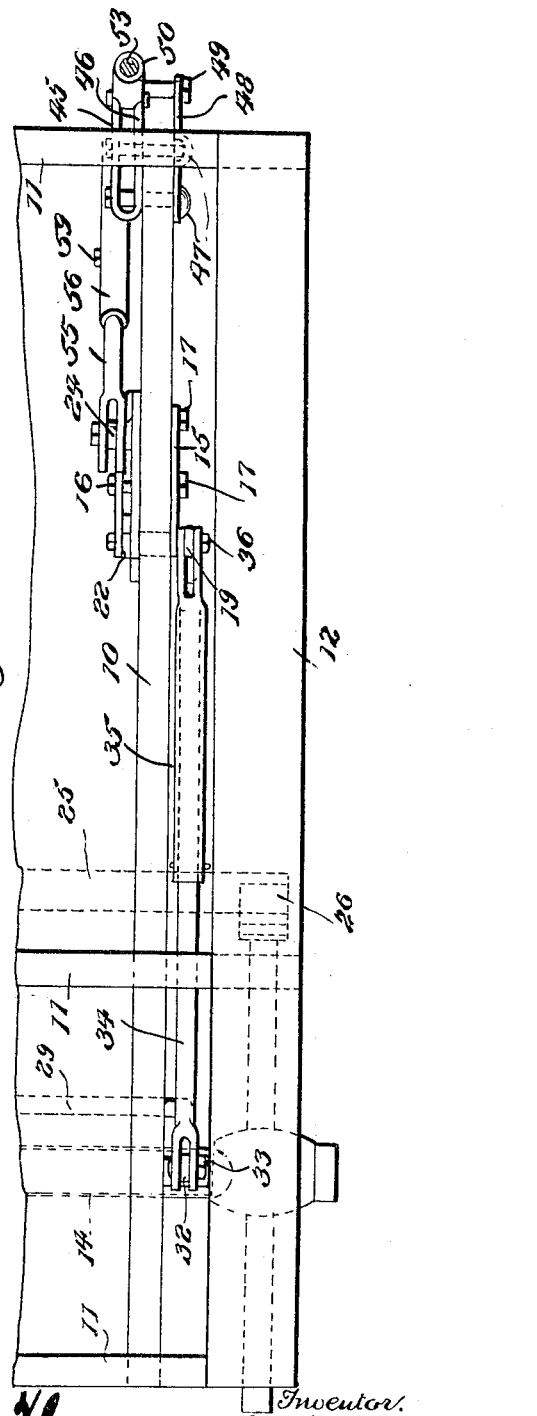

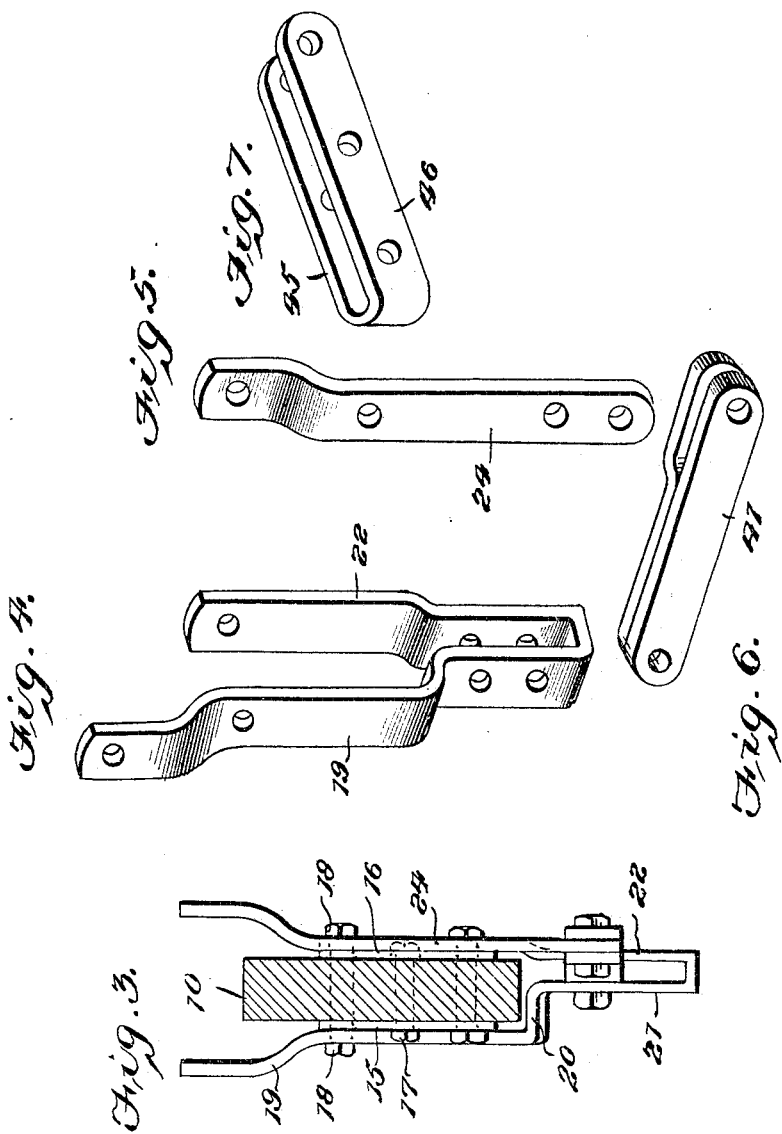

UNITED STATES PATENT OFFICE.

GUY H. WOOTEN, OF FORD, KANSAS.

BRAKE-APPLYING MECHANISM.

1,121,317.   Specification of Letters Patent.   Patented Dec. 15, 1914.

Application filed January 23, 1914. Serial No. 813,993.

*To all whom it may concern:*

Be it known that I, GUY H. WOOTEN, citizen of the United States, residing at Ford, in the county of Ford and State of Kansas, have invented certain new and useful Improvements in Brake-Applying Mechanism, of which the following is a specification.

This invention relates to vehicle brakes, more particularly to the class of brakes for attachments to hay racks, header barges, and like vehicles, and has for one of its objects to improve the construction and increase the efficiency and utility of devices of this character.

Another object of the invention is to provide a simply constructed device which may be applied to vehicles of various forms and structures without structural change in the vehicle and without material structural change in the brake mechanism.

Another object of the invention is to provide a simply constructed device which may be applied to a vehicle and operative from any point upon the vehicle or upon the load carried by the vehicle.

Another object of the invention is to provide a simply constructed device which may be so applied to the vehicle that it will not be engaged by the forward wheels after the latter are "cramped" in turning.

With these and other objects in view the invention consists in certain novel features of construction as hereinafter shown and described and then specifically pointed out in the claims; and in the drawings illustrative of the preferred embodiment of the invention Figure 1 is a side elevation of a portion of a rack and a portion of a running gear of a vehicle with the improvement applied. Fig. 2 is a plan view of the portion shown in Fig. 1. Fig. 3 is a transverse section enlarged on the line 3—3 of Fig. 1. Fig. 4 is an enlarged perspective view of the rear transmission lever. Fig. 5 is an enlarged perspective view of the forward transmission lever. Fig. 6 is an enlarged perspective view of the link, which couples the transmission lever. Fig. 7 is an enlarged perspective view of the operating lever bracket.

Corresponding and like parts are referred to in the following description and indicated in all the views of the drawings by the same reference characters.

The brake levers for hay racks and like vehicles are generally disposed externally of one of the side members 10 of the rack, as shown at 32, and near the rear wheel and axle, while the forward wheels are generally arranged to "cramp" against the side member at the forward end of the rack. Hence it is necessary to so arrange the connecting means between the brake lever and the operating lever that the requisite motion can be transmitted from the operating lever to the brake lever without interfering with the cramping action of the forward wheels and without an abnormal or unnecessarily long throw of the operating lever. In the present invention these desired results are accomplished by arranging a plurality of transmission levers between the operating lever and the brake lever and partly outside and partly inside the side member 10 of the vehicle body, so that the forward portion of the exterior of the rack is left unobstructed for the action of the forward wheels when cramping. The pivots of the transmission levers are also so arranged that the requisite throw of the brake lever is accomplished without abnormal movement of the operating lever.

For the purpose of illustration the improved device is shown applied to a conventional hay rack, but it will be understood that the device is not necessarily limited to use upon a hay rack, but may be adapted without material structural change to similar vehicles, such as header barges and the like.

In the drawings, one of the side members of the rack is represented at 10, the transverse supports at 11 and one of the rails of the laterally directed rack members at 12. A portion of one of the rear wheels is represented at 13 with a bolster represented at 14 to support the rack member. The improved device embodies two flat plates 15—16 bearing upon opposite sides of the member 10 and secured in place by a transverse bolt or like fastening device 17. Mounted to swing at 18 upon the bearing plates 15 is a lever device which for the purpose of this description is called rear transmission lever, and comprises an outer portion 19 and an inner portion 22 united at their lower ends as at 21 and with a lateral offset 20, the portion 19 bearing on the outer plate 15 and the portion 22 bearing upon the inner plate 16. The two portions 19 and 22 of the lever thus bear over the outer and inner faces of the member 10 and against the wear plates 15—16.

Pivoted to a bolt 23 which extends through the wear plates 15—16 is another lever 24, which for the purpose of this description is called the forward transmission lever. The pivot 23 is disposed intermediate the ends of the rear transmission lever 24, as shown. The brake beam is represented conventionally at 25 and carries the brake shoes, one of which is represented at 26. The beam 25 is suspended from the body by flexible devices such as chains, one of which is shown at 27.

Mounted for rotation upon the rear hounds, indicated at 28, is a rock shaft 29 having a relatively short depending arm 30 coupled to the brake beam by a rod 31. At one end the shaft 29 is extended into a relatively long arm 32. Pivoted at 33 to the vertical arm 32 is a tubular member 34, while another tubular member 35 is pivoted at 36 to the upper end of the portion 19 the rear transmission lever. The tubular member 34 is slidably disposed in the tubular member 35, the latter being provided with a plurality of apertures 37 which register with a plurality of similar apertures in the member 34, one or more clamp bolts 38 or similar devices being disposed through the registering apertures. By this means the members 34—35 may be adjustably coupled and increased or decreased in length within the range of the registering apertures as will be obvious. The rod 34 is likewise provided with a plurality of apertures 39 to receive the pivot member 33, while the tubular member 35 is provided with a plurality of apertures 40 to receive the pivot pin 36. By this means the length of the coupled rods may be adjusted longitudinally to any required extent within the range of the various apertures.

At their lower ends the transmission levers 19—24 are coupled by a link device preferably formed of bars 41, the two parts of the latter bar bearing at one of the opposite sides of the forward transmission lever and between the members 19—22 of the rear transmission lever and pivoted respectively thereto, as represented at 42—43. The rear transmission lever 19—22 is provided with a plurality of apertures 44 spaced apart through one of which the pin 42 extends. By this arrangement the link members 41 may be adjusted upon the rear transmission lever to change the leverage as hereafter explained.

Directed forwardly from the member 10 is a bracket device preferably formed with spaced sides 45—46 and bolted or otherwise secured at 47 to the inner face of the member 10. Bearing upon the outer face of the member 10 is another plate 48 secured by the same bolts 47. Pivoted at 49 between the spaced members 45—46 is an operating lever arm 50 having a plurality of spaced apertures 51 at its lower end. At its upper end the member 50 is formed preferably tubular, as represented at 52, or in socket-like form to receive an extension handle 53 to increase the leverage.

Pivoted at 54 to the upper end of the forward transmission lever 24 is a rod 55, while a tubular rod 56 is pivoted at 57 to the lower end of the lever arm 50. The rod 55 is slidably engaged in the tubular member 56, and the latter is provided with a plurality of apertures 58 which register with a plurality of similar apertures in the rod 55 and adapted to receive a clamp bolt 59. By this means the rod 55 and the tubular member 56 are adjustable longitudinally within the range of the registering apertures 58. The rod 55 is provided with a plurality of apertures 60 to receive the pivot pin 54, and thus provide for the longitudinal adjustment of the rod relative to the member 24. A spring 61 is coupled to the lever arm 50 to hold the device yieldably in its forward position.

By arranging the rods 34—35 and 55—56 to be longitudinally adjusted the improved device may be readily adapted to racks of varying lengths, and by increasing or decreasing the lengths of the rods this variation may be correspondingly increased. By providing an extension handle 53 the brake mechanism may be actuated from the top of the load upon the vehicle, as for instance upon a load of hay, alfalfa, or the like.

The tubular member 34 is curved to enable it to pass beneath the adjacent cross beam 11, and is provided with a supporting core, represented at 62, and preferably of bent wood, to reinforce the member and prevent deflection under strain.

It will be noted that a portion of the operating mechanism is externally of the rack member 10, while the remaining portion is arranged internally of the member 10, so that the strain is applied from opposite sides of the rack member.

Having thus described the invention, what is claimed as new is:

1. The combination with a vehicle body including a side member, of brake applying means adapted to operate externally of said body side member at the rear thereof, power applying means arranged to operate internally of the side member at the front thereof, transmission means operating externally and internally of the side member intermediate the ends thereof, means for connecting the external portion of the transmission means to the brake applying means, and means for connecting the internal portion of the transmission means to the power applying means.

2. The combination with a vehicle body including a side member of brake applying means adapted to operate externally of said body side member at the rear thereof, power applying means arranged to operate internally of the vehicle side member at the front thereof, a rearward transmission member pivoted at one side of its center to the outer face of said vehicle side member, a forward transmission member pivoted at one side of its center to the inner face of said vehicle side member, means connecting said power applying means to the shorter end of said forward transmission member, means connecting the brake applying means to the longer end of the rear transmission member, and a link coupling the longer end of the forward transmission member to the shorter end of the reaward transmission member.

3. The combination with a vehicle body including a side member, of a brake applying means operating externally of said body side member, a rearward transmission lever including spaced portions bearing at opposite sides of the body member and pivoted thereto with a portion extending below the body side member, a forward transmission lever pivoted at one side of its center to the inner face of said body side member and extending below the same, an operating lever, means connecting said operating lever to the shorter end of the forward transmission lever, connecting means between the longer end of said rearward transmission lever and the brake applying means, and a link connecting the longer end of the forward transmission lever to the shorter end of the rearward transmission lever.

4. The combination with a vehicle body including a side member, of a brake applying means operating externally of said body side member, wear plates bearing upon opposite sides of said body side member, a rearward transmission lever including spaced portions bearing against said wear plates, and pivoted thereto, a forward transmission lever pivoted at one side of its center to one of the wear plates and internally of said body side member, an operating lever, means connecting said operating lever to the shorter end of the forward transmission lever, means connecting the longer end of said rearward transmission lever to the brake applying means, and a link connecting the shorter end of the forward transmission lever to the longer end of the rearward transmission lever.

In testimony whereof I affix my signature in presence of two witnesses.

GUY H. WOOTEN. [L. S.]

Witnesses:
R. D. WEBSTER,
WM. PRATER.

Copies of this patent may be obtained for five cents each, by addressing the "Commissioner of Patents, Washington, D. C."